(12) United States Patent
Scougall et al.

(10) Patent No.: US 7,950,023 B2
(45) Date of Patent: May 24, 2011

(54) UTILIZING ABSTRACT DESCRIPTIONS TO GENERATE, EXCHANGE, AND CONFIGURE SERVICE AND CLIENT RUNTIMES

(75) Inventors: Jesus Ruiz Scougall, Sammamish, WA (US); Ryan Thomas Sturgell, Seattle, WA (US); Michael Jon Marucheck, Bellevue, WA (US); Alex DeJarnett, Seattle, WA (US); Stephen T. Swartz, Seattle, WA (US); Michael Steven Vernal, Seattle, WA (US); Eric K. Zinda, Seattle, WA (US); Stephen J. Millet, Edmonds, WA (US); David A. Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1525 days.

(21) Appl. No.: 11/051,041

(22) Filed: Feb. 4, 2005

(65) Prior Publication Data
US 2006/0179425 A1  Aug. 10, 2006

(51) Int. Cl.
*G06F 13/00* (2006.01)
*G06F 9/45* (2006.01)
*G06F 17/00* (2006.01)

(52) U.S. Cl. ........ 719/328; 717/140; 717/143; 715/236; 715/237; 715/239

(58) Field of Classification Search .................. 717/106, 717/108, 140, 143; 719/328, 331, 332; 715/234
See application file for complete search history.

(56) References Cited

U.S. PATENT DOCUMENTS

| | | | | |
|---|---|---|---|---|
| 7,313,575 B2 * | 12/2007 | Carr et al. | ................... | 707/104.1 |
| 7,437,374 B2 * | 10/2008 | Chen et al. | ................... | 707/101 |
| 2003/0163603 A1 * | 8/2003 | Fry et al. | ................... | 709/328 |
| 2003/0200533 A1 * | 10/2003 | Roberts et al. | ................ | 717/124 |
| 2003/0204645 A1 * | 10/2003 | Sharma et al. | ................ | 709/328 |
| 2005/0086360 A1 * | 4/2005 | Mamou et al. | ................ | 709/232 |

FOREIGN PATENT DOCUMENTS
WO  WO 2004/003770  1/2004

OTHER PUBLICATIONS

Ogbuji, Uche "WSDL Processing with XSLT," *IBM Developerworks*, Nov. 1, 2000, URL http://www-128.ibm.com/developerworks/webservices/library/ws-trans/index.html.
Wienholt, Nick "Visual C++ and CodeDom," Developer. Com, Nov. 4, 2004, URL http://www.developer.com/net/cplus/article.php/3431041.
"Web Services Metadata for the Java™ Platform," *Public Review Draft Specification*, Version 0.9, Sep. 2, 2004, pp. 1-45.

* cited by examiner

*Primary Examiner* — Andy Ho
*Assistant Examiner* — Phuong N Hoang
(74) *Attorney, Agent, or Firm* — Workman Nydegger (57) ABSTRACT

The present invention extends utilizing abstract descriptions to generate, exchange, and configure service and client runtimes. A computer system parses compiled code and potentially optional configuration information for implementing a service and converts the compiled code and any configuration information into an abstract service description. The abstract service description can then be converted into code document object model and service configuration information or exported as metadata. A corresponding service runtime can be initiated by calling a service initializer included in the abstract service description. The code document object model and configuration information and/or metadata can be transferred to another computer system. The other computer system can utilize the code document object model and configuration information and/or import the metadata to facilitate initialization of a compatible channel for communicating with the service runtime.

19 Claims, 6 Drawing Sheets

UTILIZING ABSTRACT DESCRIPTIONS TO GENERATE, EXCHANGE, AND CONFIGURE SERVICE AND CLIENT RUNTIMES

CROSS-REFERENCE TO RELATED APPLICATIONS

Not applicable.

BACKGROUND OF THE INVENTION

1. The Field of the Invention

The present invention relates to distributed application programming models and, more particularly, to utilizing abstract descriptions to generate, exchange, and configure service and client runtimes.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers, Personal Digital Assistants ("PDAs"), telephones, or any other computer or device capable of communicating over a network.

In some environments, such as, for example, a service oriented architecture environment, connection endpoints (often and hereinafter referred to as "services") communicate with one another to implement desired functionality. Desired functionality can be as simple as two services exchanging data. For example, a service consumer can send a service request message to a service provider, the service provider can receive and process the service request message, and the service provider can return a corresponding service response message to the service consumer. However, desired functionality can also be more complex, for example, involving a number of services exchanging messages to coordinate some activity. A service typically has some type of computer system (both hardware and software) that supports a corresponding offered connection.

Exchanged messages (e.g., service request messages and service response messages) can be defined in way that is understandable to each service (e.g., one or more service consumers and one or more service providers) involved in implementing desired functionality. Generally, messages can be defined in accordance with some standard, such as, for example, Distributed Component Object Model ("DCOM"), Common Object Request Broker Architecture ("CORBA"), or Web services. Web services can be further defined in accordance with various Web services specifications, such as, for example, Web Services Description Language ("WSDL"), Web Services Policy Framework ("WS-Policy"), etc.

For example, a service provider can describe its service using WSDL. The service provider can publish the description to a directory of services, for example, that uses Universal Description, Discovery, and Integration ("UDDI"). A service consumer can issue queries against the directory to locate a service and determine how to communicate with the service. Portions of the WSDL provided by the service provider are passed on to the service consumer in response to a query. The service consumer uses the WSDL portions to send a request to the service provider. In turn, the service provider provides an appropriate response to the service consumer.

In some environments, to generate a service, a developer writes source code (e.g., in C#, C++, or Visual Basic) in accordance with a specified programming model. The source code can then be compiled into a service type and the service type executed in a service runtime to provide the service to service consumers. However, service runtimes can be created in different ways and different programming models can implement distributed messaging functionality in different ways. For example, one programming model can implement a request message using one interface and a corresponding reply message using a second different interface. On the other hand, another programming model can implement both a request message and a corresponding reply message using a single interface that has separate methods. The single interface can have one method for the request message and a second different method for the corresponding reply message.

Different programming models can also be configured in accordance with different configuration options, such as, for example, security options, reliable messaging options, message logging options, connection throttling options, etc. Thus, two services that are designed to implement the same functionality (e.g., performing a mathematical operation) may implement the functionality differently.

Further, distributed applications are typically rigid in their programming models allowing only one programming model that is tightly coupled to their service runtime. Accordingly, for compatibility, a client runtime (e.g., at a service consumer) is typically required to utilize a client program or module developed in accordance with the same programming model as the server runtime. For example, if a service was developed using separate interfaces for request and reply messages or using particular security mechanisms, the service consumer must implement those as well. Failure to use a client program or module developed in accordance with the same programming model can prevent a client runtime from communicating with service runtime.

In many environments, there is a rigid coupling between a service description (or programming model and corresponding runtime. That is, a server defines its code and generates its description. To utilize the service runtime, a client downloads the service description and generates a proxy. However, subsequent, and even very minor, code changes at the server can cause the client and server to become incompatible. That is, due to the rigid coupling between service description and service runtime, changing even one configuration option or defined messaging pattern in a description document can result in an incompatible client runtime.

Changing programming models of a service runtime can also cause incompatibility with existing client runtimes. Further, disseminating information related to the new programming model can be difficult. For example, a developer of a client runtime may have to wait for publication of a new service description document before development of new client runtime can begin. Generation of a service description document may not occur until the service is complete and thus generation of service description document can lag behind deployment of a new service runtime based on a new programming model.

Unfortunately, when a service description document is not available or is incomplete in some way, it can be difficult for a client runtime developer to identify and correct incompatibility issues. Further, a client runtime developer may not have access to the service type source code written by the service runtime developer. Thus, the client runtime developer may have no way to determine new message patterns or other new configuration options associated with the new programming model. Accordingly, it may be that only through trial and error is the client runtime developer able to identify and correct incompatibility issues.

Therefore systems, methods, and computer program products for utilizing abstract descriptions to generate, exchange, and configure service and client runtimes would be advantageous.

BRIEF SUMMARY OF THE INVENTION

The foregoing problems with the prior state of the art are overcome by the principles of the present invention, which are directed towards methods, systems, and computer program products for utilizing abstract descriptions to generate, exchange, and configure service and client runtimes. In some embodiments, a computer system generates an abstract service description that describes a network-based service. The computer system accesses a service type (e.g., including compiled code) and corresponding service configuration for implementing a service in accordance with a specified programming model. The computer system parses the service type and corresponding service configuration to identify description information that describes the service based on the specified programming model. The computer system creates a service description tree for the service based on the identified description information. The format of the service description tree is independent of any programming model and is consumable such that one or more other transform modules can consume the service description tree to create additional representations of the service in other formats.

In other embodiments, a computer system transforms an abstract service description, which describes a network-based service, into code representing the service. The computer system accesses a service description tree for a service. The service description tree format is independent of any programming model and was generated from description information that was parsed from a corresponding service type and service configuration. The computer system converts the service description tree into a different representative format such that the description information can be compatibly transferred to a module that processes service description information defined in accordance with the different representative format. The computer system outputs the description information in the different representative format.

In additional embodiments, a computer system initiates a service runtime from an abstract service description that describes a networked-based service. The computer system accesses a service description tree for a service. The service description tree format is independent of any programming model and was generated from description information that was parsed from a corresponding service type and service configuration. The computer system calls an initialize service host method associated with the service description tree. The computer system initializes a service runtime for the service in accordance with the description information that was parsed from the corresponding service type and service configuration.

In further embodiments, a computer system generates source code for a channel. The computer system accesses metadata describing a service. The computer system imports the metadata into a channel description tree for a channel. The channel description tree format is independent of any programming model. The computer system generates a code document object model and corresponding service configuration from the channel description tree. The generated code document object model and corresponding service configuration are for implementing a channel in accordance with a specified programming model. The computer system outputs the generated code document object model as source code and outputs corresponding service configuration such that the generated source code and corresponding service configuration can be used to initiate a channel in accordance the specified programming model.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The foregoing problems with the prior state of the art are overcome by the principles of the present invention, which are directed towards methods, systems, and computer program products for utilizing abstract descriptions to generate, exchange, and configure service and client runtimes. In some embodiments, a computer system generates an abstract service description that describes a network-based service. The computer system accesses a service type (e.g., including compiled code) and corresponding service configuration for implementing a service in accordance with a specified programming model. The computer system parses the service type and corresponding service configuration to identify description information that describes the service based on the specified programming model. The computer system creates a service description tree for the service based on the identified description information. The format of the service description tree is independent of any programming model and is consumable such that one or more other transform modules can consume the service description tree to create additional representations of the service in other formats.

In other embodiments, a computer system transforms an abstract service description, which describes a network-based service, into code representing the service. The computer system accesses a service description tree for a service. The service description tree format is independent of any programming model and was generated from description information that was parsed from a corresponding service type and service configuration. The computer system converts the service description tree into a different representative format such that the description information can be compatibly transferred to a module that processes service description information defined in accordance with the different representative format. The computer system outputs the description information in the different representative format.

In additional embodiments, a computer system initiates a service runtime from an abstract service description that describes a networked-based service. The computer system accesses a service description tree for a service. The service description tree format is independent of any programming model and was generated from description information that was parsed from a corresponding service type and service configuration. The computer system calls an initialize service host method associated with the service description tree. The computer system initializes a service runtime for the service in accordance with the description information that was parsed from the corresponding service type and service configuration.

In further embodiments, a computer system generates source code for a channel. The computer system accesses metadata describing a service. The computer system imports the metadata into a channel description tree for a channel. The channel description tree format is independent of any programming model. The computer system generates code document object model and corresponding service configuration from the channel description tree. The generated code document object model and corresponding service configuration are for implementing a channel in accordance with a specified programming model. The computer system outputs the generated code document object model as source code and outputs corresponding service configuration such that the source code and corresponding service configuration can be used to initiate a channel in accordance the specified programming model.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
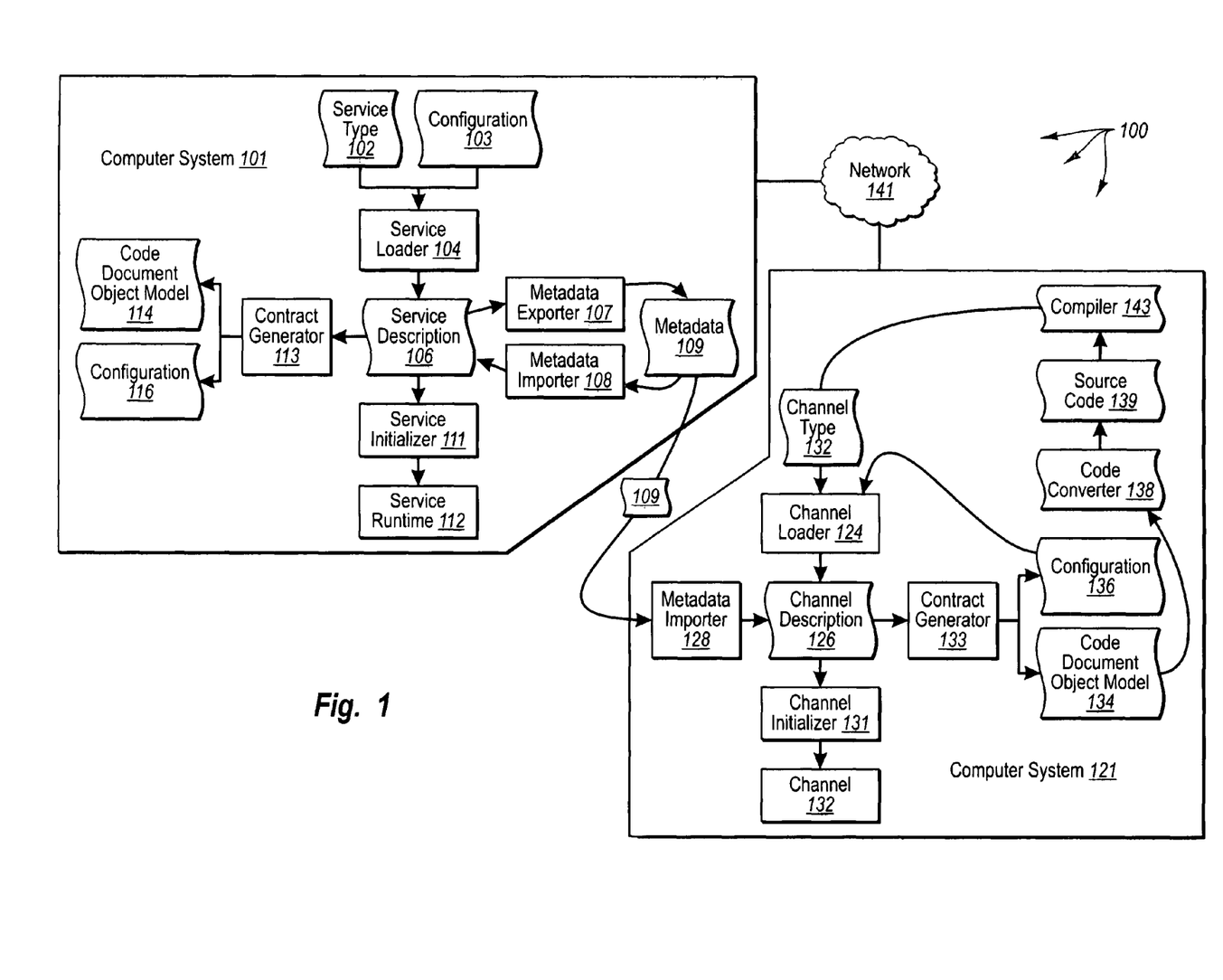
FIG. 1 illustrates an example of a computer architecture that facilitates utilizing abstract descriptions to generate, exchange, and configure service and client runtimes.

Referring now to FIG. 1, FIG. 1 illustrates an example computer architecture 100 that facilitates utilizing abstract descriptions to generate, exchange, and configure service and client runtimes. As depicted in computer architecture 100 computer systems 101 and 121 are connected to network 141. Network 141 can be a Local Area Network ("LAN"), Wide Area Network ("WAN"), or even the Internet. Computer systems connected to network 141 can receive data from and send data to other computer systems connected to network 141. Accordingly, computer systems 101 and 121, as well as other connected computer systems (not shown), can create message related data and exchange message related data (e.g., Internet Protocol ("IP") datagrams and messages in other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol ("SOAP"), etc.) over network 141.

Computer system 101 includes service loader 104, metadata exporter 107, metadata importer 108, and contract generator 113. Generally, service loader 104 is configured to receive a service type (e.g., a Common Language Runtime ("CLR") type) or other object-oriented programming model object representing a network-based service. Service loader 104 can also be configured to receive corresponding optional service configuration information. Service loader 104 can convert the service type (or other object) and corresponding service configuration information (if any is loaded) into an abstract service description.

In some embodiments, a network-based service is represented in accordance with a specified programming model. The specified programming model can be a type that implements one or more interfaces. Each interface can further implement one or more methods. The interfaces and methods included in a type can be annotated with attributes indicating how to process and publish the interfaces and methods and how to perform specified runtime processing with the interfaces and methods. Alternately, or in combination with the annotating attributes, service configuration information can also indicate how to process and publish interfaces and methods and how to perform specified runtime processing with the interfaces and methods.

Accordingly, service loader 104 can load a service type and corresponding service configuration information. Service loader 104 can parse compiled code that represents a programming model and corresponding service configuration information to identify the functionality of a represented network-based service. For example, service loader 104 can identify endpoints, channel stacks, and bindings from a service type and corresponding configuration information. Service loader 104 can also identify other runtime options, such as, for example, security options, reliable messaging options, message logging options, connection throttling options, etc. From the identified functionality, service loader 104 can create an abstract service description that describes the identified functionality.

Figure 2:
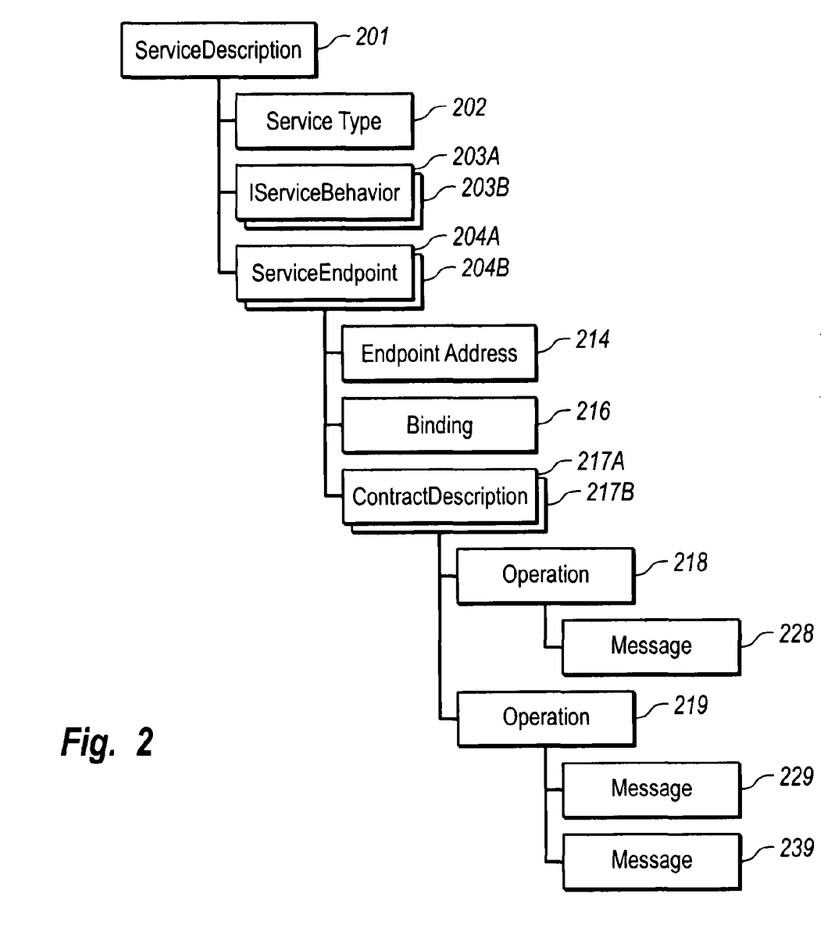
FIG. 2 illustrates an example abstract service description.

In some embodiments, an abstract service description is arranged as a tree of description information describing a network-based service. For example, referring now to FIG. 2, FIG. 2 illustrates an example abstract service description 201. Service description 201 includes service type 202 indicating the type (e.g., CLR type) of the network-based service described by service description 201. An indicated service type can be a type that implements interfaces and methods for providing the described network-based service. Service type 202 can be a type that was identified from parsing a service type and corresponding service configuration information.

Service description 201 also includes IServiceBehaviors 203A and 203B. However, one or more additional IServiceBehaviors can also be included. IServiceBehaviors 203A and 203B represent behaviors that the network-based service described by service description 201 is to implement at runtime, such as, for example, service throttling (i.e., limiting the number of concurrent request to the described service). IServiceBehaviors 203A and 203B can be behaviors that were identified from parsing a service type and corresponding service configuration information.

Service description 201 also includes service endpoints 204A and 204B. However, one or more addition service endpoints can also be included. Service Endpoints 204A and 204B represent endpoints (of an endpoint class) that include an endpoint address, a binding, and one or more contract descriptions. Service endpoints 204A and 204B can be service endpoints that were identified from parsing a service type and corresponding service configuration information.

An endpoint address is an electronic address (e.g., a Uniform Resource Locator ("URL")) for communicating with a described service (e.g., indicating where the described service is located). For example, endpoint address 214 can be an electronic address for communicating the network-based service described by service description 201. Endpoint address 214 can be an endpoint address that was identified from parsing a service type and corresponding service configuration information.

A binding indicates how data is to be transferred when communicating with the described service. A binding can include a plurality of different binding elements, such as, for example, a transport binding element (e.g., use HyperText Transfer Protocol ("HTTP") or Transmission Control Protocol ("TCP")), an encoder binding element (e.g., use UTF-8 or UTF-16), security binding elements (e.g., use a specified type of encryption), etc., applicable to different transfer characteristics. For example, binding 216 can indicate how data is to be transferred to the network-based service described by service description 201. Binding 216 can be a binding that was identified from parsing a service type and corresponding service configuration information.

A contract description indicates what data is to be transferred (e.g., a message interaction pattern) when communicating with the described service. A contract description can include one more operations. For example, a contract description for a network-based math service can include operations for addition, subtraction, multiplication, and division. Each operation can include one or more messages. For example, an addition operation can include a request message including two integers and a reply message including the sum of the two integers.

Thus, contract description 217A can indicate message interaction patterns for communicating with the network-based service described by service description 201. Some operations (e.g., operation 218) include a single message (e.g., message 228), for example, an input or output message. Other operations (e.g., operation 219) include two messages (e.g., messages 229 and 239), for example, a request message and a reply message.

Although not expressly depicted, contract description 217B can also indicate message interaction patterns for communicating with the network-based service described by service description 201. Thus, contract description 217B can also include one or more operations, each operation including one or more messages.

Referring back to FIG. 1, metadata exporter 107 can export an abstract service description, such as, for example, service description 201, into corresponding metadata, such as, for example, Web Service Description Language ("WSDL") document. Generally, metadata exporter 107 is configured to examine an abstract service description and turn the abstract service description into corresponding metadata, such as, for example, a WSDL document.

Metadata exporter 107 can target an object model that is eXtensible Markup Language ("XML") serializeable. Thus, it may be that metadata exporter 107 exports an abstract service description into an object that represents metadata. Subsequently, the object representing the metadata can then be serialized into raw metadata. For example, metadata exporter 107 can export an abstract service description to an object that represents a WSDL document. Subsequently, the object can be serialized into a WSDL document. Alternately, metadata exporter 107 can export raw WSDL document (or other metadata).

Exporting an abstract service description to metadata can include matching the constructs of the abstract service description to appropriate constructs of the metadata format. For example, metadata exporter 107 can match binding elements of an abstract service description (e.g., binding elements in binding 216) to appropriate WSDL binding elements.

Metadata importer 108 can import metadata, such as, for example, a WSDL document, into a corresponding abstract service description, such as, for example, service description 201. Generally, metadata importer 108 is configured to examine metadata and turn the metadata into a corresponding abstract service description.

Metadata importer 108 can receive an eXtensible Markup Language ("XML") serializeable object. For example, metadata importer 108 can receive an object that represents a WSDL document. Metadata importer 108 can examine the object to identify functionality of a represented network-based service. For example, metadata importer 108 can identify endpoints, channel stacks, and bindings from a service type and corresponding configuration information. Metadata importer 108 can also identify other runtime options, such as, for example, security options, reliable messaging options, message logging options, connection throttling options, etc. From the identified functionality, metadata importer 108 can create an abstract service description that describes the identified functionality. Alternately, metadata importer 108 can receive raw WSDL (or other metadata) and perform similar operations to create an abstract service description Importing metadata into an abstract service description can include matching the constructs of the metadata format to appropriate constructs of abstract service description. For example, metadata importer 108 can match binding elements of a metadata format to appropriate abstract service description bindings.

Both metadata exporter 107 and metadata importer 108 can be configured to support third party plug-ins that facilitates extensibility when converting from an abstract service description to metadata and vice versa. Third party plug-ins can implement customized translation between an abstract service description and metadata. For example, plug-ins can facilitate the translation of policy statements defined in accordance with a Web services specification, such as, for example, WS-Policy, WS-RM (reliable messaging). WS-Policy can be used to define XML elements statements representing virtually any policy, such as, for example, for performing encryption in a certain way, provide key information, etc. WS-RM can be used to define reliable messaging characteristics, such as, for example, timeout values.

Accordingly, extensible policy statements can be exported to and imported from a WSDL document. For example, an exporter plug-in to metadata exporter 107 can examine an abstract service description for policy elements and insert the appropriate policy assertions into a WSDL document. Thus, if a binding in an abstract service description contains a defined RM binding element, the exporter plug-in can find the RM binding element and add the appropriate RM policy assertion to exported metadata. On the other hand, an importer plug-in to metadata importer 108 can examine a WSDL document for policy assertions and insert the appropriate policy elements into an abstract service description. Thus, if metadata contains an RM policy assertion for a binding element, the importer plug-in can find the RM policy assertion and add the appropriate defined RM binding element to an imported abstract service description.

Plug-ins can also facilitate exportation of a portion of an abstract service description into arbitrary XML elements and attributes in a WSDL document and importation of arbitrary XML elements and attributes in a WSDL document into the appropriate portion of an abstract service description.

Referring still to FIG. 1, contract generator 113 can convert an abstract service description into code document object model and corresponding service configuration information. Generally, contract generator 113 is configured to examine an abstract service description and turn the abstract service description into corresponding code document object model and service configuration information.

Service contract generator 113 can target a public object mode, such as, for example, a Code Document Object Model ("CodeDOM"). Language providers can use the CodeDOM to generate code (e.g., C#, C++, or Visual Basic) based upon the CodeDOM. Thus, an abstract service description can be converted to interfaces that represent a contract description, methods that represent operations, and parameters and return values that represent messages. Accordingly, source code in the language neutral format can indicate how XML should appear when on the wire and can include some security information.

Service contract generator 113 can also store corresponding service configuration information, such as, for example, service endpoints, endpoint addresses, bindings, channel behaviors, in a service configuration file. The configuration file can be provided to a service loader when a service type (compiled code) generated from the source code is parsed for conversation to an abstract service description. In some embodiments, the code document object model and configuration file can be used at a client to construct a channel for communicating with the described service.

Computer system 121 includes channel loader 124, metadata importer 128, contract generator 133, code converter 138, and compiler 143.

Channel loader 124 functions similarly to service loader 104. Channel loader 124 loader 104 can load a channel type and corresponding channel configuration information. Channel loader 124 can parse compiled code that represents a programming model and corresponding channel configuration information to identify the functionality for communicating with a network-based service. For example, channel loader 104 can identify an endpoint, channel stack, and binding from a channel type and corresponding configuration information. Channel loader 124 can also identify other runtime options, such as, for example, security options, reliable messaging options, message logging options, connection throttling options, etc. From the identified functionality, channel loader 124 can create an abstract channel description that describes the identified functionality.

Figure 3:
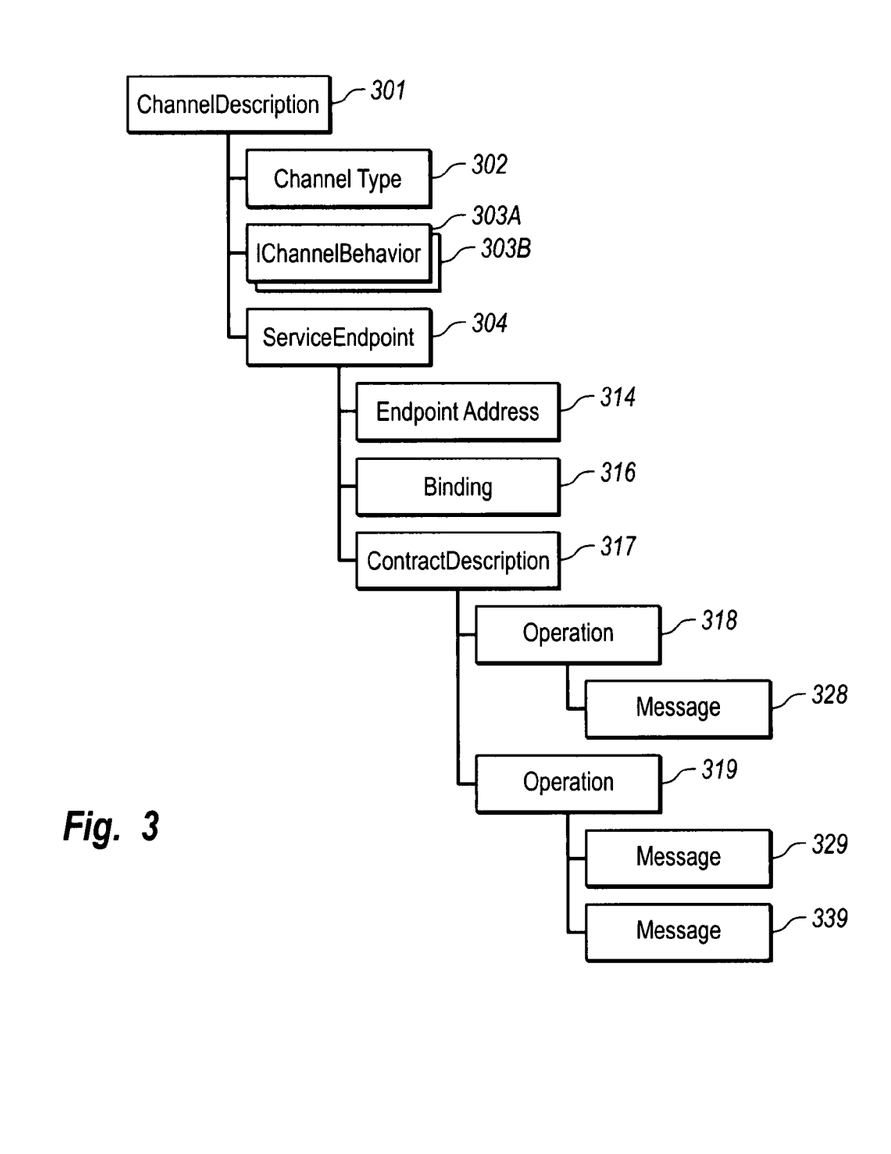
FIG. 3 illustrates an example abstract channel description.

In some embodiments, an abstract channel description is arranged as a tree of description information describing how to communication with a network-based service. For example, referring now to FIG. 3, FIG. 3 illustrates an example abstract channel description 301. Channel description 301 includes channel type 302 indicating the type (e.g., CLR type) of the network-based channel described by channel description 301. An indicated channel type can be a type that implements interfaces and methods for communicating with a corresponding network-based service. Channel type 302 can be a type that was identified from parsing a service type and corresponding service configuration information.

Channel description 301 also includes IChannelBehaviors 303A and 303B. However, one or more additional IChannelBehaviors can also be included. IChannelBehaviors 303A and 303B represent behaviors that the network-based channel described by channel description 301 is to implement at runtime, such as, for example, reliable messaging and authorization. IChannelBehaviors 303A and 303B can be behaviors that were identified from parsing a channel type and corresponding service configuration information.

Channel description 301 also includes service endpoint 304. Service endpoint 304 represent an endpoint (of an endpoint class) that includes an endpoint address, a binding, and one or more contract descriptions. Service endpoint 304 can be a service endpoint that was identified from parsing a channel type and corresponding service configuration information.

Endpoint address 314 can be an electronic address for communicating the network-based channel described by channel description 301. Endpoint address 314 can be an endpoint address that was identified from parsing a channel type and corresponding service configuration information. Binding 316 can indicate how data is to be transferred to the network-based channel described by channel description 301. Binding 316 can be a binding that was identified from parsing a service type and corresponding service configuration information. Contract description 317 can indicate message interaction patterns for communicating with the network-based channel described by service description 301. Some operations (e.g., operation 318) include a single message (e.g., message 328), for example, an input or output message. Other operations (e.g., operation 319) include two messages (e.g., messages 329 and 339), for example, a request message and a reply message.

Metadata importer 128 functions similarly to metadata importer 128. Thus, metadata importer 128 can import metadata, such as, for example, a WSDL document, into a corresponding abstract channel description, such as, for example, channel description 201. Generally, metadata importer 128 is configured to examine metadata and turn the metadata into a corresponding abstract channel description. Metadata importer 128 can import XML serializable objects or raw metadata and can include extensible $3^{rd}$ party plug-ins as previously described. Metadata importer 128 can also match the constructs of the metadata format to appropriate constructs of abstract service description. For example, metadata importer 128 can match binding elements of a metadata format to appropriate abstract channel description bindings.

Contract generator 133 functions similarly to contract generator 113. Thus, contract generator 133 can convert an abstract channel description into code document object model and corresponding service configuration information. Generally, contract generator 133 is configured to examine an abstract channel description and turn the abstract channel description into corresponding code document object model and service configuration information. Contract generator 133 can target a public object for representing source code in a language neutral format and that can subsequently converted code to a supported programming language. Thus, an abstract channel description can be converted to interfaces that represent a contract description, methods that represent operations, and parameters and return values that represent messages. Accordingly, source code in the language neutral format can indicate how XML should appear when on the wire and can include some security information.

Contract generator 133 can also store corresponding service configuration information, such as, for example, service endpoints, endpoint addresses, bindings, channel behaviors, in a service configuration file. The configuration file can be provided to a channel loader when a channel type (compiled code) generated from the source code is parsed for conversation to an abstract channel description. In some embodiments, the code document object model and configuration file can be used at a client to construct a channel for communicating with the described service.

Code converter 138 is configured to convert code document object model into source code of a programming language. Code converter 138 can be part of the same object model used to generate code document object model. Compiler 143 is configured to compile source code of a programming language into compiled code of a channel type. Compiler 143 can be, for example, a C#, a C++ or a Visual Basics compiler, and can be part of an integrated development environment ("IDE").

Figure 5:
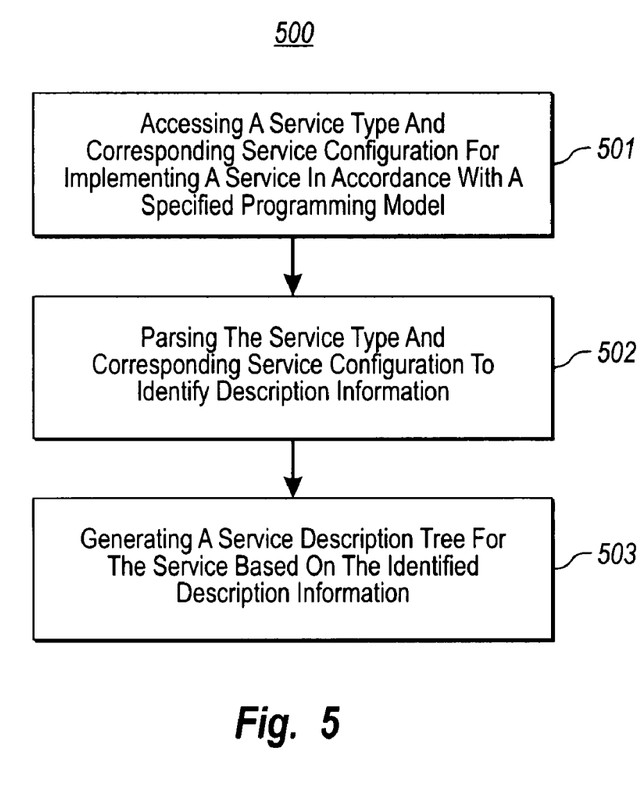
FIG. 5 illustrates a flow chart of an example method for generating an abstract service description that describes a network-based service.

FIG. 5 illustrates a flow chart of an example method 500 for generating an abstract service description that describes a network-based service. Method 500 will be described with respect to the components and data depicted in computer architecture 100 and service description 201.

Method 500 includes an act of accessing a service type and corresponding service configuration for implementing a service in accordance with a specified programming model (act 501). For example, service loader 104 can access service type 102 and configuration 103. Service type 102 can represent compiled code that was compiled from source code of a programming language (C#, C++, Visual Basic, etc.). Interfaces and methods included in service type 102 can be annotated with attributes describing a service. Configuration 103 can include additional service configuration information describing the service.

Method 500 includes an act of parsing the service type and corresponding service configuration to identify description information (act 502). For example, service loader 104 can parse service type 102 and configuration 103 to identify description information corresponding to the service represented by service type 102. Identified description information can includes a variety of connection and/or communication protocol options, such as, for example, a service type, service behaviors (e.g., security options, reliable messaging options, message logging options, connection throttling options) and service endpoints (e.g., endpoint addresses, bindings, and contract descriptions, including operations and messages).

Method 500 includes an act of generating a service description tree for the service based on the identified description information (act 503). For example, service loader 104 can generate service description 106 based on description information identified from service type 102 and configuration 103. Service description 106 can be a service description tree similar to service description 201. An identified service type, identified service behaviors, and identified service endpoints can be created at the appropriate locations in the corresponding tree structure.

Figure 6:
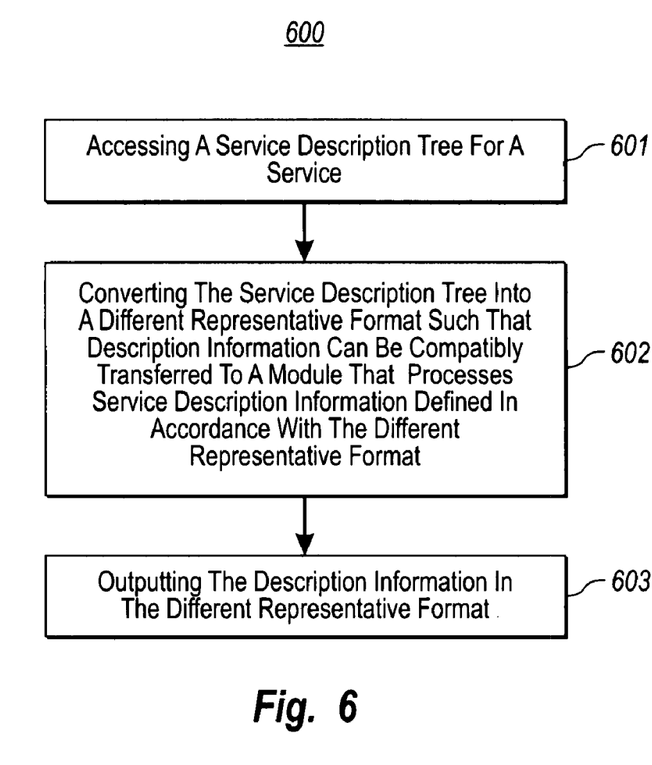
FIG. 6 illustrates a flow chart of an example method for transforming an abstract service description, which describes a networked-based service, into code representing the networked-based service.

FIG. 6 illustrates a flow chart of an example method 600 for transforming an abstract service description, which describes a networked-based service, into code representing the networked-based service. Method 600 will be described with respect to the components and data depicted in computer architecture 100.

Method 600 includes an act of accessing a service description tree for a service (act 601). For example, metadata exporter 107 can access service description 106. Alternately, contract generator 113 can access service description 106.

Method 600 includes an act of converting the service description tree into a different representative format such that description information can be compatibly transferred to a module that processes service description information defined in accordance with the different representative format (act 602). For example, metadata exporter 107 can export service description 106 into metadata 109 (or an object representing metadata 109) such that a metadata importer (e.g., metadata importer 128) can subsequently import metadata 109 (or the object representing metadata 109) back into a service (or channel) description.

Alternately, contract generator 113 can convert service description 106 into code document object model 114 and configuration 116. Code document object model 114 can be subsequently used to generate source code of a programming language. A developer can then modify the code as appropriate to insure appropriate functionality or to add additional functionality. Source code of the programming language can then be compiled. Configuration 116 includes at least a subset of the configuration information from configuration 103. For example, configuration 116 can include appropriate configuration settings for constructing a channel to communicate with service runtimes based on service type 102.

Method 600 includes an act out of outputting the description information in the different representative format (act 603). For example, metadata exporter 107 can send metadata 109 to metadata importer 128. Alternately, contract generator 113 can send code document object model 114 and configuration 116 to computer system 121. Either of metadata 109 and code document object model 114 and configuration 116 can be subsequently converted, modified, and or compiled into a channel at computer system 121.

Figure 7:
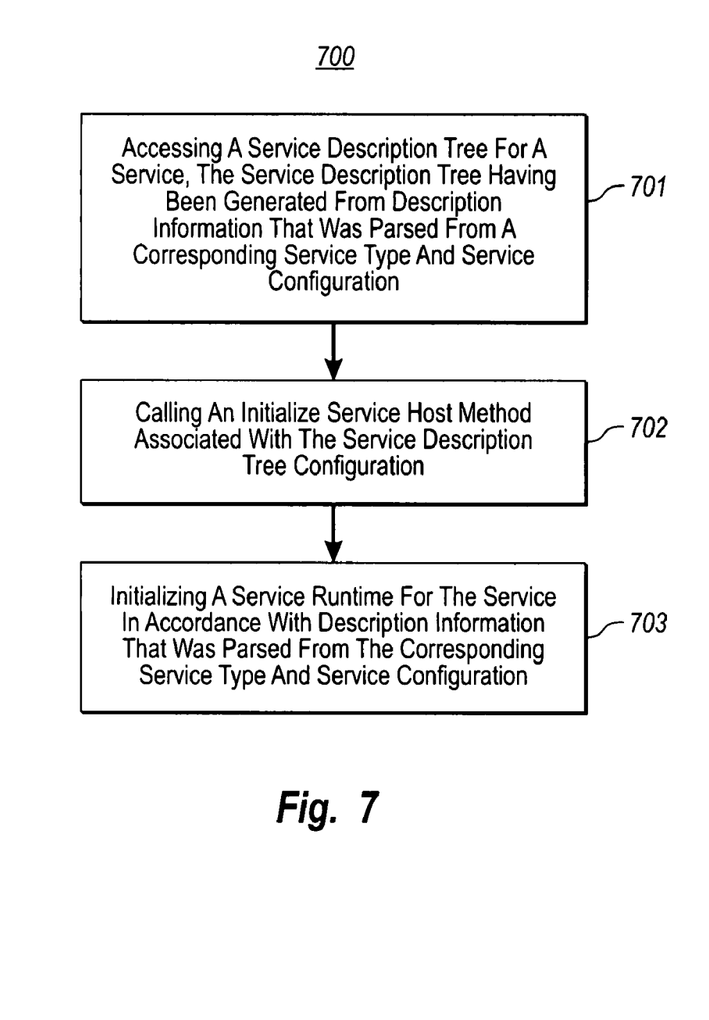
FIG. 7 illustrates a flow chart of an example method for initiating a service runtime from an abstract service description that describes a networked-based service.

FIG. 7 illustrates a flow chart of an example method 700 for initiating a service runtime from an abstract service description that describes a networked-based service. Method 700 will be described with respect to the components and data depicted in computer architecture 100.

Method 700 includes an act of accessing a service description tree for a service, the service description tree having been generated from description information that was parsed from a corresponding service type and service configuration (act 701). For example, computer system 101 can access service description 106 that was generated from description information parsed from service type 102 and configuration 103.

Method 700 includes an act of calling an initialize service host method associated with the service description tree (act 702). For example, computer system 101 can call service initializer 111 associated with the service description 106. In some embodiments, the initialize service host is executable code included in service description 106. Thus, it may be that service description 106 calls service initializer 111.

Method 700 includes an act of initializing a service runtime for the service in accordance with description information that was parsed from the corresponding service type and service configuration (act 703). For example, service runtime 112 can be initialized in accordance with description information parsed from service type 102 and configuration 103.

Figure 8:
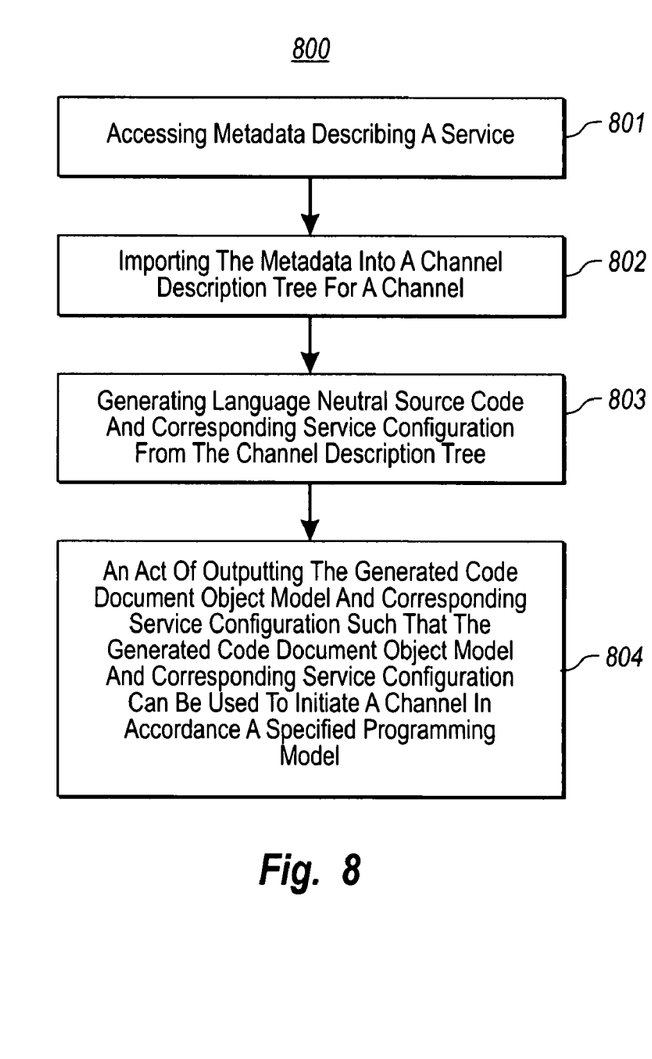
FIG. 8 illustrates a flow chart of an example method for generating source code for channel.

FIG. 8 illustrates a flow chart of an example method 800 for generating source code for a channel. Method 800 will be described with respect to the components and data depicted in computer architecture 100.

Method 800 includes an act of accessing metadata describing a service (act 801). For example, metadata importer 128 can access metadata 109. Method 800 includes an act of importing the metadata into a channel description tree for a channel (act 802). For example, metadata importer 128 can import metadata 109 into channel description 126.

Method 800 includes an act of generating a code document object model and corresponding service configuration from the channel description tree (act 803). For example, contract generator 133 can generate code document object model 134 and configuration 136 from channel description 126.

Method 804 includes an act of outputting the generated code document object model and corresponding service configuration such that the generated code document object model and corresponding service configuration can be used to initiate a channel in accordance a specified programming model (act 804). For example, code converter 138 can use code document object model 134 to generate source code 139. Compiler 143 can then compile source code 139 into channel type 132.

Channel loader 124 can then parse channel type 132 and configuration 136 to generated refined channel description 126. Subsequently, channel description 126 can call channel initiator 131 to initialize channel 132 in accordance with description information parsed form channel type 132 and configuration 136. Channel 132 and service runtime 112 can then communicate to utilize the service represented by service type 102.

Embodiments of the present invention facilitate flexible exchange of service description information. For example, a server can provide a client with metadata and/or source code indicating how a channel is to be configured for compatible communication with a service runtime. Further, third party plug-ins facilitate the importation and exportation of policy assertions and arbitrary XML between a server and a client. Accordingly, the present invention promotes interoperability between a service runtime and corresponding channels.

Figure 4:
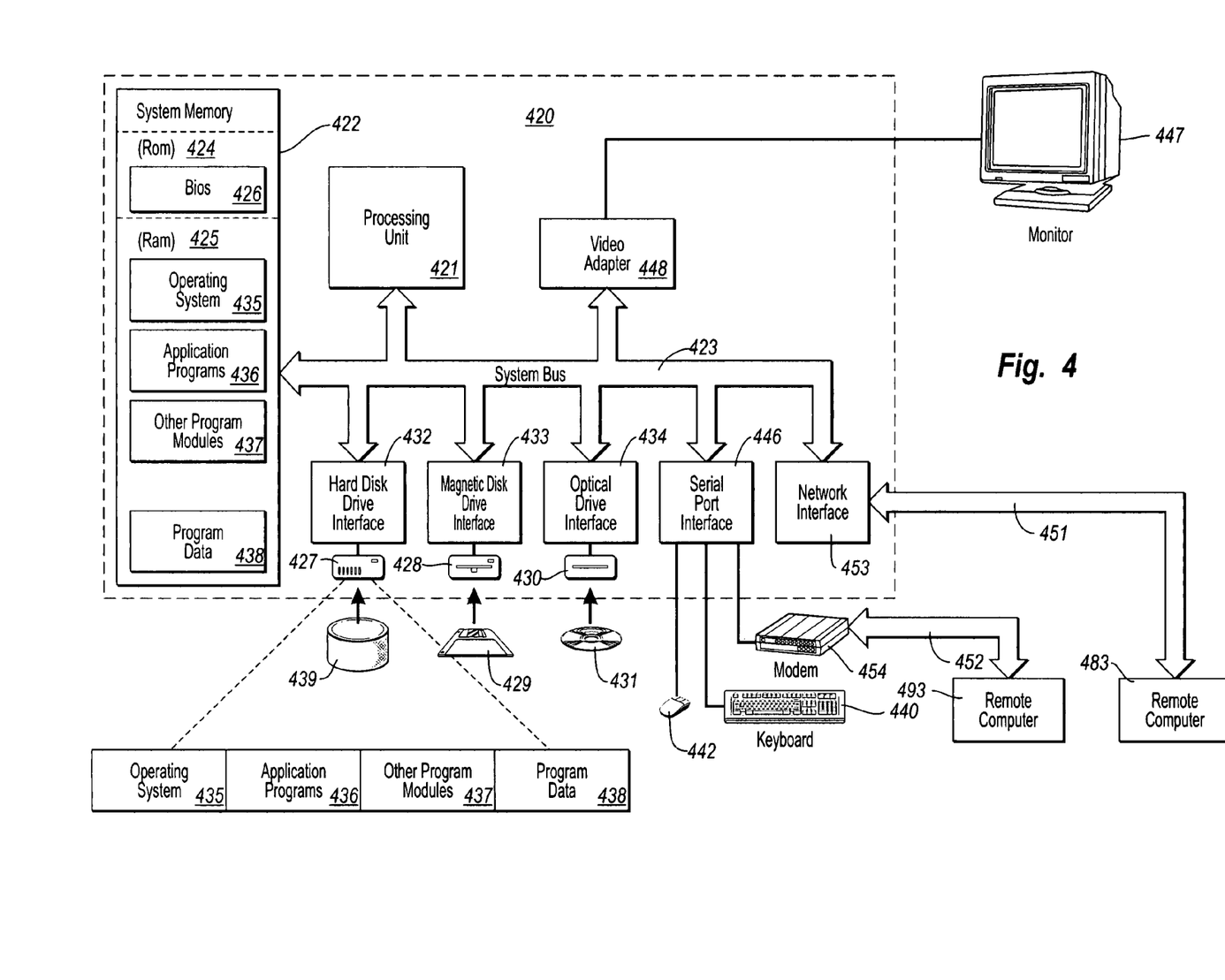
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Other peripheral output devices (not shown), such as, for example, speakers and printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 459, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including service loaders, contract generators, metadata importers, metadata exporters, service initializes, service runtimes, and channels as well as associated data, including service types, configuration, code document object models, metadata, service descriptions, and channel descriptions, may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A method, implemented within a computer system that includes at least one processor and system memory, for generating an abstract service description that describes a network-based service, the method comprising:

an act of accessing a service type and corresponding service configuration for implementing a network-based service in accordance with a specified programming language, the service type including compiled executable code that has been compiled into executable format from source code written in the specified programming language, the compiled executable code including at least one annotation describing how to process and publish at least one interface implemented by the compiled executable code and describing how to perform runtime processing with the at least one interface;

an act of parsing the service type and corresponding service configuration to identify description information, the description information describing information for using the network-based service based on the specified programming language, the act of parsing comprising an act of parsing the compiled executable code of the service type, including the at least one annotation, to identify the description information; and an act of creating a service description tree for the network-based service based on the description information identified from the parsing of the compiled executable code of the service type, the format of the service description tree being independent of any programming language, the service description tree being consumable such that one or more other transform modules can consume the service description tree to create additional representations of the network-based service in other formats, the one or more other transform modules being configured to consume the service description tree to create:

source code written in a second programming language for implementing the network-based service in accordance with the second programming language, the source code written in a second programming language configured to be compiled to executable format; and a WSDL document describing the network-based service implemented in accordance with the second programming language.

2. The method as recited in claim 1, wherein the act of parsing the compiled executable code of the service type comprises an act of parsing the compiled executable code of the service type to identify description information selected from among an end point address, a binding, or a contract description.

3. The method as recited in claim 1, wherein the act of parsing the service type and corresponding service configuration to identify description information comprises an act of parsing the service configuration identify description information selected from among security options, reliable messaging options, message logging options, or connection throttling options.

4. The method as recited in claim 1, wherein the act of creating a service description tree for the network-based service based on the identified description information comprises an act of creating a representation of a contract description that describes data to be transferred when communicating with the network-based service, including corresponding operations and messages.

5. The method as recited in claim 1, wherein the act of creating a service description tree for the network-based service based on the identified description information comprises an act of creating a representation of service behaviors that the network-based service is to implement at runtime.

6. The method as recited in claim 1, wherein the description information comprises:
a service type indicating the specified programming language;
at least one service behavior that represents at least one behavior that the network-based service is to implement at runtime; and
at least one service endpoint.

7. The method as recited in claim 6, wherein at least one service behavior includes at least one of a security option, a reliable messaging option, a message logging option or a connection throttling option.

8. The method as recited in claim 6, wherein at least one service endpoint includes:
an endpoint address that comprises an electronic address for communicating with the network-based service;
a binding that indicates how data is to be transferred when communicating with the network-based service; and
at least one contract description that indicates what data is to be transferred when communicating with the network-based service.

9. The method as recited in claim 1, wherein the at least one interface implements at least one method, and wherein the at least one method is annotated with an attribute indicating how to process and publish the at least one method, and how to perform runtime processing with the at least one method.

10. The method as recited in claim 1, further comprising:
an act of exporting the service description tree into corresponding Web Service Description Language (WSDL) metadata for the WSDL document.

11. The method as recited in claim 1, further comprising:
an act of converting the service description tree into a Code Document Object Model (CodeDOM) and corresponding configuration information;

an act of generating generated source code based on the CodeDOM; and
act of compiling the generated source code.

12. A method, implemented within a computer system that includes at least one processor and system memory, for transforming an abstract service description, which describes a network-based service, into source code representing the network-based service, the method comprising:
an act of accessing a service description tree for a network-based service, the service description tree format being independent of any programming language, the service description tree having been generated from description information describing information for using the network-based service that was parsed from a corresponding service type and service configuration for implementing the network-based service, at least a portion of the description information having been parsed from compiled executable code of the service type, the compiled executable code having been compiled into executable format from source code written in a first programming language, the compiled executable code including at least one annotation describing how to process and publish at least one interface implemented by the compiled executable code and describing how to perform runtime processing with the at least one interface;
an act of converting the service description tree into a different representative format such that the description information can be compatibly transferred to a module that processes service description information defined in accordance with the different representative format, wherein the act of converting the service description tree into a different representative format comprises an act of exporting the service description tree from a non-WSDL format into a WSDL format; and
an act of outputting the description information in the different representative format.

13. The method as recited in claim 12, wherein the act of accessing a service description tree for a network-based service comprises an act of accessing behaviors for the network-based service that the network-based service is to implement at runtime.

14. The method as recited in claim 12, wherein the act of accessing a service description tree for a network-based service comprises an act of accessing a contract description for the network-based service that describes data to be transferred when communicating with the network-based service, including corresponding operations and messages.

15. The method as recited in claim 12, wherein the act of converting the service description tree into a different representative format further comprises an act of converting the service description tree into a code document object model and corresponding service configuration.

16. The method as recited in claim 15, wherein the act of converting the service description tree into a code document object model and corresponding service configuration comprises an act of converting the service description tree into source code.

17. The method as recited in claim 15, wherein the act of converting the service description tree into a code document object model and corresponding service configuration comprises an act of the service description tree into language neutral source that represents service endpoints.

18. The method as recited in claim 15, wherein the act of converting the service description tree into a code document object model and corresponding service configuration comprises an act of the service description tree into service configuration that represents service behaviors selected from among security options, reliable messaging options, message logging options, and connection throttling options.

19. A computer program product of for use at a computer system, the computer program product for implementing a method of generating an abstract service description that describes a network-based service, the computer program product comprising one or more computer storage media having stored thereon computer-executable instructions that, when executed by a processor, cause the computer system to perform the following:

access a service type and corresponding service configuration for implementing a network-based service in accordance with a specified programming language, the service type including compiled executable code that has been compiled into executable format from source code written in the specified programming language, the compiled executable code including at least one annotation describing how to process and publish at least one interface implemented by the compiled executable code and describing how to perform runtime processing with the at least one interface;

parse the service type and corresponding service configuration to identify description information, the description information describing information for using the network-based service based on the specified programming language, at least a portion of the description information being parsed from the compiled executable code of the service type, including that at least one annotation; and create a service description tree for the network-based service based on the description information identified from the parsing of the compiled executable code of the service type, the format of the service description tree being independent of any programming language, the service description tree being consumable such that one or more other transform modules can consume the service description tree to create additional representations of the network-based service in other formats, the one or more other transform modules being configured to consume the service description tree to create:

source code written in a second programming language for implementing the network-based service in accordance with the second programming language, the source code written in a second programming language configured to be compiled to executable format; and a WSDL document describing the network-based service implemented in accordance with the second programming language.

\* \* \* \* \*